United States Patent
Taveira et al.

(10) Patent No.: US 10,636,314 B2
(45) Date of Patent: Apr. 28, 2020

(54) ADJUSTING FLIGHT PARAMETERS OF AN AERIAL ROBOTIC VEHICLE BASED ON PRESENCE OF PROPELLER GUARD(S)

(71) Applicant: QUALCOMM Incorporated, San Diego, CA (US)

(72) Inventors: Michael Franco Taveira, Rancho Santa Fe, CA (US); Daniel Warren Mellinger, III, Philadelphia, PA (US)

(73) Assignee: Qualcomm Incorporated, San Diego ( * ) Notice: Subject to any disclaimer, the term of this patent is extended or adjusted under 35 U.S.C. 154(b) by 0 days.

(21) Appl. No.: 15/860,874

(22) Filed: Jan. 3, 2018

(65) Prior Publication Data

US 2019/0206267 A1 Jul. 4, 2019

(51) Int. Cl.
  *G08G 5/04* (2006.01)
  *B64C 39/02* (2006.01)
  (Continued)

(52) U.S. Cl.
  CPC ............ *G08G 5/04* (2013.01); *B64C 27/006* (2013.01); *B64C 27/20* (2013.01); *B64C 39/024* (2013.01);
  (Continued)

(58) Field of Classification Search
  CPC ........ G08G 5/04; G08G 5/003; B64C 27/006; B64C 39/024; B64C 2201/027; B64C 2201/108; B64D 45/00; B64D 2045/0085
  (Continued)

(56) References Cited

U.S. PATENT DOCUMENTS

| 4,809,178 A | 2/1989 | Ninomiya et al. |
| 5,979,824 A * | 11/1999 | Gagliano ................. B64C 1/26 244/13 |

(Continued)

FOREIGN PATENT DOCUMENTS

| CN | 204776022 U | 11/2015 |
| CN | 106347656 A | 1/2017 |

(Continued)

OTHER PUBLICATIONS

Dji et al., "Phantom 4: Prop Guards Installation Guide", Apr. 20, 2016 (Apr. 20, 2016), XP055546279, 5 Pages, Retrieved from the Internet: URL:https://dl.djicdn.com/downloads/phantom_4/en/En_Phantom_4_Prop_Guard_User_Guide_160420.pdf [retrieved on Jan. 23, 2019].

(Continued)

*Primary Examiner* — Muhammad Shafi
(74) *Attorney, Agent, or Firm* — The Marbury Law Group

(57) ABSTRACT

Various embodiments include methods and aerial robotic vehicles that adjust a flight control parameter based on whether propeller guards are installed. An aerial robotic vehicle processor may determine whether a propeller guard is installed, set a flight parameter based on the determination, and control one or more motors of the aerial robotic vehicle using the flight parameter. When propeller guards are installed, the flight parameter may be set to a value appropriate for controlling the aerial robotic vehicle when the propeller guard is installed. The flight parameter may be one or more of control gains, drag profile control settings, a maximum rotor speed, maximum speed of the aerial robotic vehicle, maximum power usage, restrictions to select modes of operation, visual algorithm settings, or a flight plan. Data (Continued)

from one or more sensors and/or motor controllers may be used to determine the presence of a propeller guard.

32 Claims, 8 Drawing Sheets

(51) Int. Cl.
- *B64C 27/00* (2006.01)
- *B64D 45/00* (2006.01)
- *G08G 5/00* (2006.01)
- *B64C 27/20* (2006.01)

(52) U.S. Cl.
CPC ............ *B64D 45/00* (2013.01); *G08G 5/003* (2013.01); *B64C 2201/027* (2013.01); *B64C 2201/108* (2013.01); *B64D 2045/0085* (2013.01); *G08G 5/0021* (2013.01); *G08G 5/0052* (2013.01); *G08G 5/0069* (2013.01)

(58) Field of Classification Search
USPC .......................................................... 701/3
See application file for complete search history.

(56) References Cited

U.S. PATENT DOCUMENTS

| | | | |
|---|---|---|---|
| 6,253,128 B1 | 6/2001 | Kageyama et al. | |
| 6,270,038 B1 | 8/2001 | Cycon et al. | |
| 7,335,071 B1 | 2/2008 | Motsenbocker | |
| 8,239,125 B2 | 8/2012 | Petrie et al. | |
| 8,355,861 B2 | 1/2013 | Petrini | |
| 8,543,265 B2 | 9/2013 | Ekhaguere et al. | |
| 8,761,967 B2* | 6/2014 | Fisher ................ | B64C 29/0033 244/99.2 |
| 9,043,052 B2 | 5/2015 | So et al. | |
| 9,261,879 B2 | 2/2016 | Ferguson et al. | |
| 9,421,869 B1 | 8/2016 | Ananthanarayanan et al. | |
| 9,609,288 B1 | 3/2017 | Richman et al. | |
| 9,613,539 B1 | 4/2017 | Lindskog et al. | |
| 9,632,507 B1 | 4/2017 | Korn | |
| 9,927,807 B1 | 3/2018 | Ganjoo | |
| 2003/0051544 A1 | 3/2003 | Hong | |
| 2006/0192047 A1 | 8/2006 | Goossen | |
| 2007/0034734 A1 | 2/2007 | Yoeli | |
| 2007/0080793 A1 | 4/2007 | Blase | |
| 2009/0283629 A1 | 11/2009 | Kroetsch et al. | |
| 2012/0025962 A1 | 2/2012 | Toll | |
| 2012/0025964 A1 | 2/2012 | Beggs et al. | |
| 2012/0232722 A1* | 9/2012 | Fisher ................ | B64C 29/0033 701/3 |
| 2014/0136044 A1 | 5/2014 | Conrad | |
| 2015/0269847 A1 | 9/2015 | Knight | |
| 2015/0321759 A1 | 11/2015 | Caubel et al. | |
| 2016/0016664 A1 | 1/2016 | Basuni | |
| 2016/0023759 A1* | 1/2016 | Barrett ................ | A63H 27/12 244/17.23 |
| 2016/0039529 A1 | 2/2016 | Buchmueller et al. | |
| 2016/0075332 A1 | 3/2016 | Edo-Ros | |
| 2016/0185345 A1 | 6/2016 | Sasabuchi et al. | |
| 2016/0200437 A1 | 7/2016 | Ryan et al. | |
| 2016/0247115 A1 | 8/2016 | Pons | |
| 2017/0029101 A1* | 2/2017 | Weissenberg ......... | B64C 27/006 |
| 2017/0043869 A1 | 2/2017 | Howard et al. | |
| 2017/0069214 A1 | 3/2017 | Dupray et al. | |
| 2017/0076616 A1 | 3/2017 | Kanade et al. | |
| 2017/0090480 A1 | 3/2017 | Ho et al. | |
| 2017/0132334 A1 | 5/2017 | Levinson et al. | |
| 2017/0144753 A1 | 5/2017 | Yu et al. | |
| 2017/0158320 A1 | 6/2017 | Bosch | |
| 2017/0177937 A1 | 6/2017 | Harmsen et al. | |
| 2017/0235018 A1 | 8/2017 | Foster et al. | |
| 2017/0242442 A1 | 8/2017 | Minster | |
| 2017/0255206 A1 | 9/2017 | Chen et al. | |
| 2017/0267234 A1 | 9/2017 | Kemp et al. | |
| 2017/0267347 A1 | 9/2017 | Rinaldi et al. | |
| 2017/0301249 A1 | 10/2017 | Kunzi et al. | |
| 2017/0313421 A1 | 11/2017 | Gil et al. | |
| 2017/0323256 A1 | 11/2017 | Cheatham, III et al. | |
| 2017/0339487 A1 | 11/2017 | Alvord et al. | |
| 2018/0155018 A1 | 6/2018 | Kovac et al. | |
| 2018/0246529 A1 | 8/2018 | Hu et al. | |
| 2018/0275654 A1 | 9/2018 | Merz et al. | |
| 2018/0290748 A1 | 10/2018 | Corban et al. | |
| 2018/0297695 A1 | 10/2018 | Ramirez-Serrano | |
| 2019/0202449 A1 | 7/2019 | Taveira et al. | |
| 2019/0205609 A1 | 7/2019 | Taveira et al. | |
| 2019/0206266 A1 | 7/2019 | Taveira et al. | |
| 2019/0206268 A1 | 7/2019 | Taveira et al. | |
| 2019/0225327 A1 | 7/2019 | Kidakarn | |

FOREIGN PATENT DOCUMENTS

| | | |
|---|---|---|
| DE | 202013006196 U1 | 10/2014 |
| GB | 2483881 A | 3/2012 |
| KR | 20100027683 A | 3/2010 |
| WO | 2010135727 A1 | 11/2010 |
| WO | 2014027945 A1 | 2/2014 |
| WO | 2016053194 A1 | 4/2016 |
| WO | 2017043694 A1 | 3/2017 |
| WO | 2017086234 A1 | 5/2017 |
| WO | 2017168423 A1 | 10/2017 |
| WO | 2018032924 A1 | 2/2018 |

OTHER PUBLICATIONS

International Search Report and Written Opinion—PCT/US2018/063759—ISA/EPO—dated Jan. 31, 2019 17 pages.
"PhantomPilots", Retrieved from Internet on Sep. 27, 2017, https://phantompilots.com/threads/propeller-guards-mounted-obstacle-avoidance-turned-of, pp. 1-9.

* cited by examiner

ADJUSTING FLIGHT PARAMETERS OF AN AERIAL ROBOTIC VEHICLE BASED ON PRESENCE OF PROPELLER GUARD(S)

BACKGROUND

Rotor-based aerial robotic vehicles, also referred to as, "unmanned aerial vehicles," "UAVs," or "drones," are commonly used for a variety of applications, such as surveillance, photography, and/or cargo delivery. Since the propeller blades may present a hazard to nearby creatures and/or objects, the propeller blades may be at least partially covered with propeller guards to provide additional safety. Thus, flight parameters of the drone, which control various aspects of how the drone flies and/or operates, are generally configured with the assumption that propeller guards are installed on the drone.

SUMMARY

Various embodiments include devices, systems, and methods for operating an aerial robotic vehicle that adjusts one or more flight parameters used for controlling the aerial robotic vehicle based upon whether propeller guards are installed. In various embodiments, methods implemented by a processor of an aerial robotic vehicle may include determining whether a propeller guard is installed on the aerial robotic vehicle, setting a flight parameter based on the determination as to whether the propeller guard is installed on the aerial robotic vehicle, controlling one or more motors of the aerial robotic vehicle using the flight parameter for collision avoidance. In some embodiments, setting the flight parameter may include setting the flight parameter to values appropriate for controlling the aerial robotic vehicle when the propeller guard is not installed in response to determining that the propeller guard is not installed. In some embodiments, setting the flight parameter may include setting the flight parameter to values appropriate for controlling the aerial robotic vehicle when the propeller guard is installed in response to determining that the propeller guard is installed. In some embodiments, setting the flight parameter may include maintaining the flight parameter at a currently set value in response to determining that the propeller guard is installed. In various embodiments, setting the flight parameter may include setting one or more of control gains, drag profile control settings, a maximum rotor speed, maximum speed of the aerial robotic vehicle, maximum power usage, restrictions to select modes of operation, visual algorithm settings, or a flight plan of the aerial robotic vehicle in response to determining that the propeller guard is installed.

Some embodiments may further include determining whether the propeller guard is damaged in response to determining that the propeller guard is installed, in which setting the flight parameter is further based on the determination of whether the propeller guard is damaged.

Some embodiments may further include determining whether a propeller guard meets a predetermined standard in response to determining that the propeller guard is installed, in which setting the flight parameter is further based on the determination of whether the propeller guard meets the predetermined standard. In such embodiments, the predetermined standard may include a minimum size for propeller guards and/or a style of the propeller guard.

Some embodiments may further include obtaining data from a sensor configured to detect whether the propeller guard is installed on the aerial robotic vehicle, and analyzing the obtained data to determine whether the propeller guard is installed. In such embodiments, the sensor may be at least one of a contact sensor, a weight sensor, an image sensor, or a radio-frequency identification tag reader. In such embodiments, analyzing the obtained data may include comparing the obtained data to previously collected data indicating the propeller guard is installed, in which the propeller guard is determined to be installed in response to the obtained data matching the previously collected data indicating the propeller guard is installed and the propeller guard is determined to not be installed in response to the obtained data not matching the previously collected data indicating the propeller guard is installed. In such embodiments, analyzing the obtained data may include comparing the obtained data to predetermined parameters indicating the propeller guard is installed, wherein the propeller guard may be determined to be installed in response to the obtained data matching the predetermined parameters indicating the propeller guard is installed and the propeller guard may be determined to not be installed in response to the obtained data not matching the predetermined parameters indicating the propeller guard is installed.

Some embodiments may further include obtaining data from the one or more motors indicating a rate of revolution of respective one or more motors, and analyzing the obtained data to determine whether the propeller guard is installed. In such embodiments, analyzing the obtained data may include determining how many propeller guards are installed on the aerial robotic vehicle.

Some embodiments may further include receiving an input override indicating the propeller guard is or is not installed, in which determining whether the propeller guard is installed may be further based on the received input override.

Further embodiments include an aerial robotic vehicle having a sensor for detecting the presence of one or more propeller guards and a processor configured with processor-executable instructions to perform operations of any of the methods summarized above. Further embodiments include a processing device for use in an aerial robotic vehicle configured to perform operations of any of the methods summarized above. Further embodiments include an aerial robotic vehicle having means for performing functions of any of the methods summarized above. Further embodiments include a non-transitory processor-readable media having stored thereon processor-executable instructions configured to cause a processor of an aerial robotic vehicle to perform operations of any of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
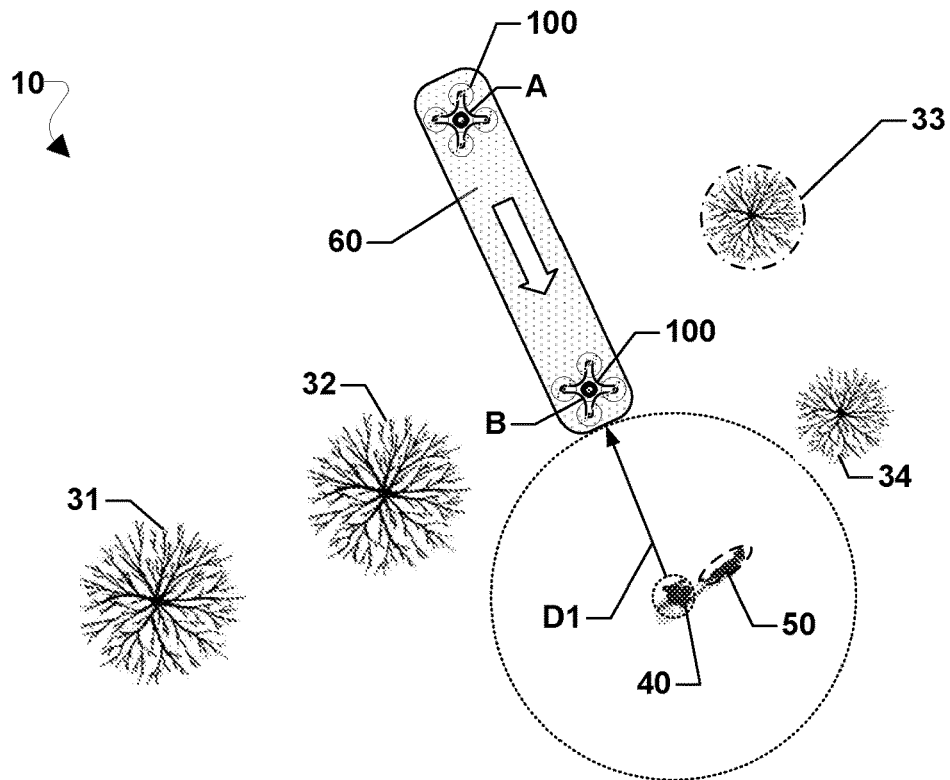
FIG. 1A is a plan view of an environment in which an aerial robotic vehicle, without propeller guards, operates with restricted flight parameters when approaching a user, in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and aerial robotic vehicles processing devices implementing such methods for operating the aerial robotic vehicle. In particular, various embodiments determine whether one or more propeller guards are installed on the aerial robotic vehicle from data obtained by one or more sensors. The processing device sets one or more flight parameters of the aerial robotic vehicle based on the determination as to whether the propeller guard is installed on the aerial robotic vehicle. In addition, the processing device controls a motor of the aerial robotic vehicle using the one or more flight parameters set in this way.

Flight parameters of an aerial robotic vehicle may include numerous settings of a flight control system that control how the aerial robotic vehicle operates, particularly in flight. For example, control gains that govern the precise proportional value between the magnitude of motor control input signals and output signals are generally keyed to the assumption that propeller guards are either installed or not installed. Similarly, the addition of propeller guards may cause a change in the drag profile of an aerial robotic vehicle sufficient to change how the vehicle responds to flight controls, but control settings that take into account the drag profile are typically preconfigured for a set configuration of drone components. Similarly, certain modes of operation of aerial robotic vehicles, such as the follow-me mode or the palm take-off/landing mode, assume propeller guards are present making the aerial robotic vehicle safe enough to fly extremely close to people. Once flight parameters of aerial robotic vehicles are set, if propeller guards are later installed or removed, the flight parameters may not take into account such a change. By setting one or more flight parameters based on whether propeller guards are installed, various embodiments may increase safety (including perceived safety by people near the aerial robotic vehicle) and improve the operation of the aerial robotic vehicle.

The term "aerial robotic vehicle" is used herein to refer to various types of vehicles that are capable of autonomous flight and that include at least a processing unit for controlling flight of the vehicle according to stored instructions (e.g., data indicating a predetermined flight plan, etc.). Aerial robotic vehicles include unmanned aircraft that are capable of flying without any human interaction, with some human interaction (e.g., providing flight instructions to be executed by the processing unit), under partial human control, and under full human control (e.g., during take-off and landings.) Aerial robotic vehicles may be of various design types capable of executing vertical lift-offs, such as helicopter-type drones configured with any number of rotors (e.g., quad-copter aerial robotic vehicles having four rotors, etc.). Although aerial robotic vehicles may be selectively controlled by human operators, aerial robotic vehicles may be capable of independently performing at least a series of instructions, commands, and/or routines for testing flight stability as described herein. An aerial robotic vehicle includes a control system including a processor for executing processor-executable instructions for controlling the various functionalities of the aerial robotic vehicle, such as communications (e.g., wireless signaling via Wi-Fi®, Bluetooth®, Long Term Evolution (LTE), etc.), data collection (e.g., polling sensors, etc.), propulsion/navigation, power management, and stability management (e.g., calculating center-of-gravity, etc.). Aerial robotic vehicles may or may not be configured to carry payloads during missions, such as surveillance aerial robotic vehicles configured merely to travel to various locations in order to capture camera imagery or delivery aerial robotic vehicles configured to drop-off packages to a destination address and return to an address of origin.

The term "propeller guard" is used herein to refer to a frame, cage, or other shielding structure that surrounds, or at least partially surrounds, a propeller. The propeller guard generally allows the free rotational movement of the propeller and safeguards the propeller from contact with other objects.

The term "flight parameter," is used herein to refer to a numerical or other measurable factor forming one of a set that defines a flight control system or sets the conditions of the operation of the flight control system that are associated with propeller guards either being installed or not being installed on an aerial robotic vehicle.

As used herein, the term "computing device" refers to an electronic device equipped with at least a processor. Examples of computing devices include processors within a security device, a robotic vehicle and/or a mission management computer that are onboard the robotic vehicle, as well as remote computing devices communicating with the robotic vehicle configured to perform operations of the various embodiments. Computing devices may include wireless communication devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in various example embodiments may be coupled to or include wireless communication capabilities implementing various embodiments, such as network transceiver(s) and antenna(s) configured to establish a local area network (LAN) connection (e.g., Wi-Fi® transceivers).

In some embodiments, one or more of various flight parameters may be set based on the determination of whether propeller guards are installed on the aerial robotic vehicle. A first set of flight parameters may be associated with propeller guards not being installed and a second set of flight parameters may be associated with propeller guards being installed. Thus, setting the flight parameter of the aerial robotic vehicle may include setting the flight parameter to the first set of flight parameters in response to determining that the propeller guard is not installed and setting the flight parameter to the second set of flight parameters in response to determining that the propeller guard is installed. In some embodiments, setting the flight parameter of the aerial robotic vehicle may include maintaining the flight parameter at a currently set value.

In various embodiments, a processor of an aerial robotic vehicle may be configured to obtain data from one or more sensors configured to detect whether one or more propeller guards is installed on the aerial robotic vehicle. For example, the one or more sensors may include a contact sensor, a weight sensor, an image sensor (e.g., a camera), or a radio-frequency identification reader. Alternatively or additionally, the processor may be configured to obtain data from a motor indicating a rate of revolutions (e.g., revolutions per minute (RPM)), which may be analyzed for determining whether the propeller guard is installed. Analyzing the data may determine how many propeller guards are installed on the aerial robotic vehicle. In addition, the aerial robotic vehicle may be configured to receive an input override, from an operator or control system, indicating the propeller guard is or is not installed. Thus, determining whether the propeller guard is installed is further based on the received input override.

In various embodiments, in response to a processor determining that the propeller guard is installed, the processor may determine whether a detected propeller guard is damaged. In some embodiments, in response to a processor determining that the propeller guard is installed, the processor may determine whether a propeller guard meets a predetermined standard. For example, the predetermined standard may include a particular style and/or a minimum size for propeller guards.

In some embodiments, the processor may analyze the obtained data from the sensor(s), such as by comparing the obtained data to previously collected data indicating the propeller guard is installed. In this way, the processor may determine that the propeller guard is installed in response to the obtained data matching the previously collected data indicating the propeller guard is installed and the propeller guard is determined to not be installed in response to the obtained data not matching the previously collected data indicating the propeller guard is installed. Additionally, the processor may analyze the obtained data from the sensor by comparing the obtained data to predetermined parameters indicating the propeller guard is installed. Thus, the processor may determine that the propeller guard is installed in response to the obtained data matching the predetermined parameters indicating the propeller guard is installed, and the processor may determine that the propeller guard is not be installed in response to the obtained data not matching the predetermined parameters indicating the propeller guard is installed.

Figure 1B:
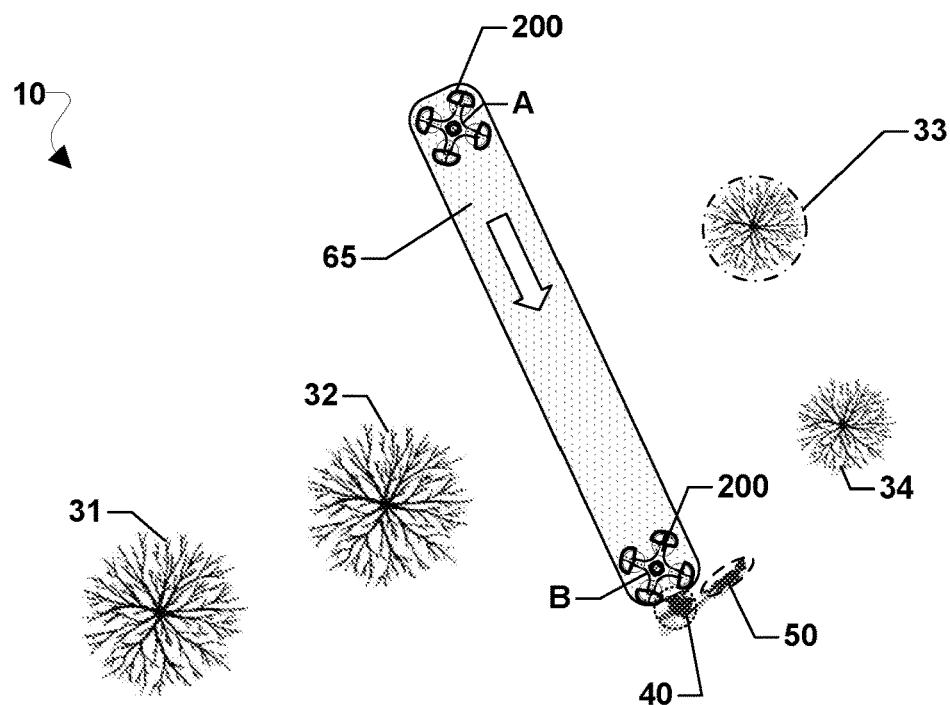
FIG. 1B is a plan view of the environment of FIG. 1A, in which an aerial robotic vehicle, with propeller guards mounted thereon, travels all the way to a user without flight parameter restrictions, in accordance with various embodiments.

FIGS. 1A-1B illustrate plan views of an environment 10 in which aerial robotic vehicles may travel, avoiding various obstacles therein. In particular, the environment 10 includes various trees 31, 32, 33, 34 and an operator 40 walking a dog 50.

Operations of an aerial robotic vehicle 100, without propeller guards, within the environment 10, according to various embodiments, are illustrated in FIG. 1A. With reference to FIG. 1A, a processor of the aerial robotic vehicle may determine whether a propeller guard is installed on the aerial robotic vehicle based on obtained data. The determination by the processor may be part of a pre-flight setup and/or as part of a dynamic inflight analysis. The processor may set at least one flight parameter of the aerial robotic vehicle based on the determination as to whether the propeller guard is installed. Since the aerial robotic vehicle 100 does not have propeller guards installed, the processor may set flight parameters that turn off a palm take-off/landing mode. Thus, without propeller guards, the processor may not allow the aerial robotic vehicle to approach the user closer than a standoff distance D1 (e.g., 20'). The processor may use the standoff distance D1 as a proximity threshold, limiting how close the aerial robotic vehicle may fly near the operator, and optionally all other objects (e.g., the trees 31-34 and the dog 50).

From position A, when the aerial robotic vehicle 100 approaches the operator 40, attempting to perform a palm landing, the processor may process data received from onboard sensors (e.g., a camera, radar, lidar, etc.) to detect objects along the path 60 toward the operator 40. Normally, palm landing mode would enable and automatically guide the aerial robotic vehicle 100 to fly all the way up to and onto the palm of the operator 40. With the flight parameters set such that the palm take-off/landing mode has been switches off, the aerial robotic vehicle 100 may not approach the operator 40 any closer than the standoff distance D1. Once the aerial robotic vehicle 100 reaches position B (i.e., at the standoff distance D1 from the operator 40), a proximity threshold will prohibit further progress and may perform an automatic landing. Alternatively, upon reaching position B, the aerial robotic vehicle 100 may stop forward progress and maintain a hover, allowing the operator to control the landing.

Operations of an aerial robotic vehicle 200, which includes propeller guards, within the environment 10, according to various embodiments, are illustrated in FIG. 1B. With reference to FIG. 1A-1B, a processor of the aerial robotic vehicle may determine whether a propeller guard is installed on the aerial robotic vehicle based on obtained data. The determination by the processor may be part of a pre-flight setup and/or as part of a dynamic in-flight analysis. The processor may set a flight parameter of the aerial robotic vehicle based on the determination as to whether the propeller guard is installed. Since the aerial robotic vehicle 200 has propeller guards installed, the processor may turn on the palm take-off/landing mode or leave the palm take-off/landing mode on if it is already on.

From position A, when the aerial robotic vehicle 200 approaches the operator 40 while attempting to perform a palm landing, the processor may process data received from onboard sensors (e.g., a camera, radar, lidar, etc.) to detect objects along the path 65 toward the operator 40. With the flight parameters set such that the palm take-off/landing mode is set to on, the aerial robotic vehicle 200 may fly all the up to and land in the palm of the operator 40.

Figure 2:
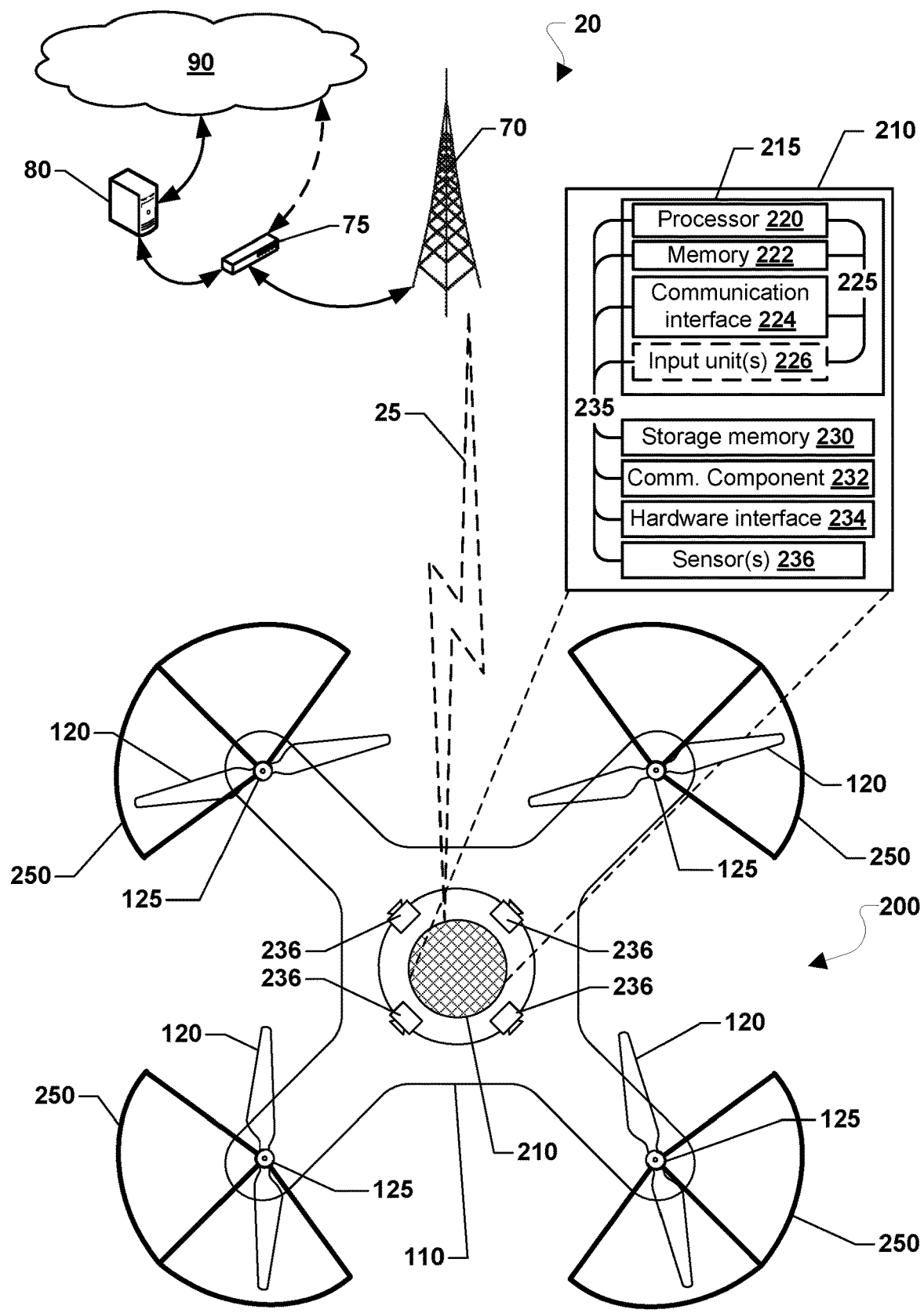
FIG. 2 is a block diagram illustrating components of an aerial robotic vehicle and a ground station suitable for use in various embodiments.

Various embodiments may be implemented within a variety of aerial robotic vehicles configured to communicate with one or more communication networks, an example of which in the form of an aerial robotic vehicle 200 suitable for use with various embodiments is illustrated in FIG. 2. With reference to FIGS. 1A-2, the aerial robotic vehicle 200, operating in a mission environment 20, may include a plurality of rotors 120 (e.g., four rotors), each driven by a corresponding motor 125. A body 110 of the aerial robotic vehicle 200 may support the plurality of rotors 120 and motors 125, as well as propeller guards 250.

The aerial robotic vehicle 200 may include one or more onboard sensors, such as one or more cameras 236, or other sensors like contact sensors, weight sensors, or a radio-frequency identification reader. The aerial robotic vehicle 200 may include a processing device 210, which may further include one or more attitude sensors, such as an altimeter, a gyroscope, accelerometers, an electronic compass, a satellite positioning system receiver, etc., that may be used by the processor 220 to determine vehicle attitude and location information for controlling flight and navigation.

Cameras 236 may be disposed in various locations on the aerial robotic vehicle 200 and different types of camera may be used. For example, a first set of cameras 236 may face a side of each of the rotors 120 in the plane of rotation thereof, such as mounted near a central part of the aerial robotic vehicle 200. Additionally, or alternatively, second set of cameras 236 may be mounted under the rotors 120, such as in a position configured to detect whether propeller guards 250 are installed.

Image data generated by the cameras 236 may be used by an object avoidance system executing in the processor 220. In various embodiments, image data received from cameras 236 may be processed by an object avoidance system to detect whether propeller guards 250 are installed. The image data received from cameras 236 may also be processed by an object avoidance system to inspect for damage to propeller guards 250. In some embodiments, active sensors (not shown) located away from the rotors, but still on the aerial robotic vehicle, may enable the processor to detect the presence of propeller guards by measuring certain materials embedded in or on propeller guards 250.

The aerial robotic vehicle 200 may include a processing device 210 that may be coupled to each of the plurality of motors 125 that drive the rotors 120. The processing device 210 may be configured to monitor and control the various functionalities, sub-systems, and components of the aerial robotic vehicle 200. For example, the processing device 210 may be configured to monitor and control various modules, software, instructions, circuitry, hardware, etc. related to propulsion, navigation, power management, sensor management, and/or stability management.

The processing device 210 may house various circuits and devices used to control the operation of the aerial robotic vehicle 200. For example, the processing device 210 may include a processor 220 that directs the control of the aerial robotic vehicle 200. The processor 220 may include one or more processors configured to execute processor-executable instructions (e.g., applications, routines, scripts, instruction sets, etc.) to control flight, antenna usage, and other operations of the aerial robotic vehicle 200, including operations of various embodiments. In some embodiments, the processing device 210 may include memory 222 coupled to the processor 220 and configured to store data (e.g., flight plans, obtained sensor data, received messages/inputs, applications, etc.). The processor 220 and memory 222 may be configured as or be included within a system-on-chip (SoC) 215 along with additional elements such as (but not limited to) a communication interface 224, one or more input units 226, non-volatile storage memory 230, and a hardware interface 234 configured for interfacing the SoC 215 with hardware and components of the aerial robotic vehicle 200. Components within the processing device 210 and/or the SoC 215 may be coupled together by various circuits, such as a bus 225, 235 or another similar circuitry.

The processing device 210 may include more than one SoC 215 thereby increasing the number of processors 220 and processor cores. The processing device 210 may also include processors 220 that are not associated with the SoC 215. Individual processors 220 may be multi-core processors. The processors 220 may each be configured for specific purposes that may be the same as or different from other processors 220 of the processing device 210 or SoC 215. One or more of the processors 220 and processor cores of the same or different configurations may be grouped together. A group of processors 220 or processor cores may be referred to as a multi-processor cluster.

The terms "system-on-chip" or "SoC" are used herein to refer to a set of interconnected electronic circuits typically, but not exclusively, including one or more processors (e.g., 220), a memory (e.g., 222), and a communication interface (e.g., 224). The SoC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In various embodiments, the processing device 210 may include or be coupled to one or more communication components 232, such as a wireless transceiver, an onboard antenna, and/or the like for transmitting and receiving wireless signals through the wireless communication link 25. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the one or more communication components 232, and an antenna may be configured to conduct wireless communications with a variety of remote computing devices, examples of which include the base station or cell tower (e.g., base station 20), a beacon, server, a smartphone, a tablet, or another computing device with which the aerial robotic vehicle 200 may communicate. The processor 220 may establish the wireless communication link 25 via a modem and the antenna. In some embodiments, the one or more communication components 232 may be configured to support multiple connections with different remote computing devices using different radio access technologies. In some embodiments, the one or more communication components 232 and the processor 220 may communicate over a secured communication link. The security communication links may use encryption or another secure means of communication in order to secure the communication between the one or more communication components 232 and the processor 220.

The aerial robotic vehicle 200 may operate in the mission environment 20 communicating with a base station 70, which may provide a communication link to a remote computing device 75 and/or a remote server 80 via a communication network 90. The base station 70 may provide the wireless communication link 25, such as through wireless signals to the aerial robotic vehicle 200. The remote computing device 75 may be configured to control the base station 70, the aerial robotic vehicle 200, and/or control wireless communications over a wide area network, such as providing a wireless access points and/or other similar network access point using the base station 70. In addition, the remote computing device 75 and/or the communication network 90 may provide access to a remote server 80. The aerial robotic vehicle 200 may be configured to communicate with the remote computing device 75 and/or the remote server 80 for exchanging various types of communications and data, including location information, navigational commands, data inquiries, and mission data.

Aerial robotic vehicles may navigate or determine positioning using altimeters or navigation systems, such as Global Navigation Satellite System (GNSS), Global Positioning System (GPS), etc. In some embodiments, the aerial robotic vehicle 200 may use an alternate source of positioning signals (i.e., other than GNSS, GPS, etc.). The aerial robotic vehicle 200 may use position information associated with the source of the alternate signals together with additional information (e.g., dead reckoning in combination with last trusted GNSS/GPS location, dead reckoning in combination with a position of the aerial robotic vehicle takeoff zone, etc.) for positioning and navigation in some applications. Thus, the aerial robotic vehicle 200 may navigate using a combination of navigation techniques, including dead-reckoning, camera-based recognition of the land features below and around the aerial robotic vehicle 200 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the aerial robotic vehicle 200 may use one or more of various input units 226 for receiving control instructions, data from human operators or automated/pre-programmed controls, and/or for collecting data indicating various conditions relevant to the aerial robotic vehicle 200. For example, the input units 226 may receive input from one or more of various components, such as camera(s), microphone(s), position information functionalities (e.g., a global positioning system (GPS) receiver for receiving GPS coordinates), flight instruments (e.g., attitude indicator(s), gyroscope(s), anemometer, accelerometer(s), altimeter(s), compass(es), etc.), keypad(s), etc. The camera(s) may be optimized for daytime and/or nighttime operation.

Aerial robotic vehicles may be winged or rotor craft varieties. For example, the aerial robotic vehicle 200 may be a rotary propulsion design that utilizes one or more rotors 120 driven by corresponding motors to provide lift-off (or take-off) as well as other aerial movements (e.g., forward progression, ascension, descending, lateral movements, tilting, rotating, etc.). The aerial robotic vehicle 200 is illustrated as an example of an aerial robotic vehicle that may utilize various embodiments, but is not intended to imply or require that various embodiments are limited to a quad-rotor aircraft.

Figure 3A:
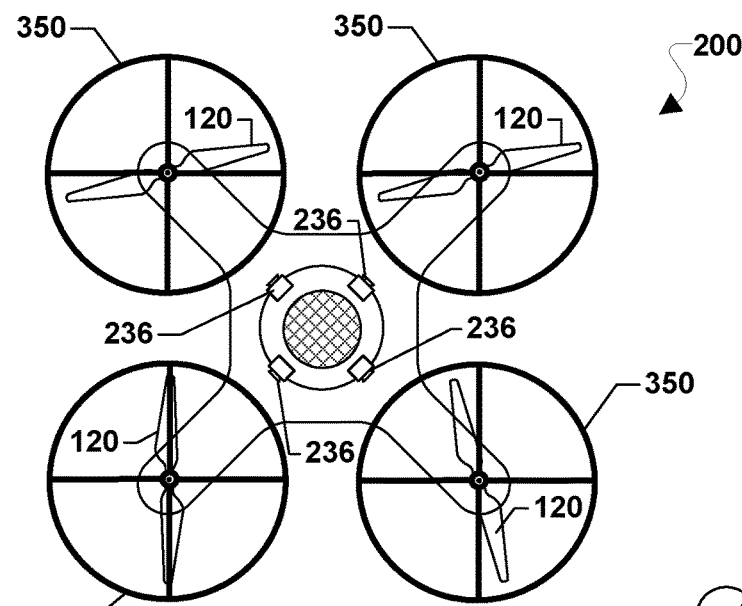
FIGS. 3A-3C are diagrams illustrating some conditions in which propeller guards may be installed on an aerial robotic vehicle, in accordance with various embodiments.
Figure 3B:
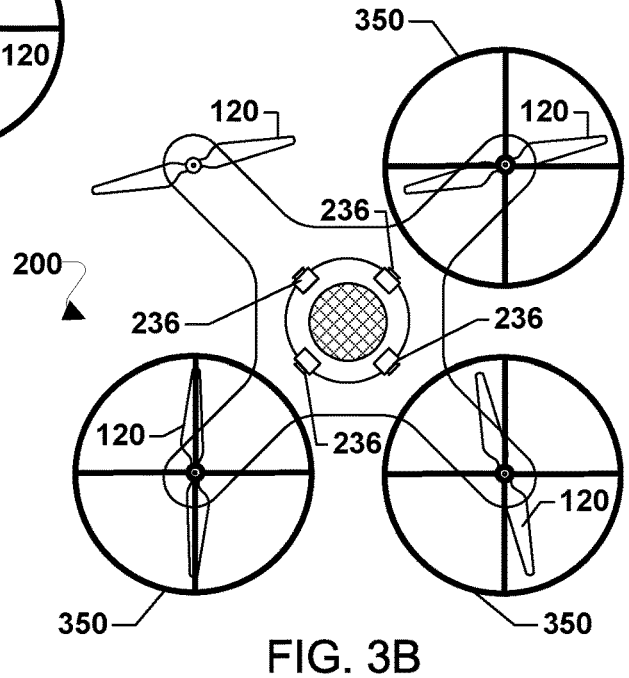
Figure 3C:
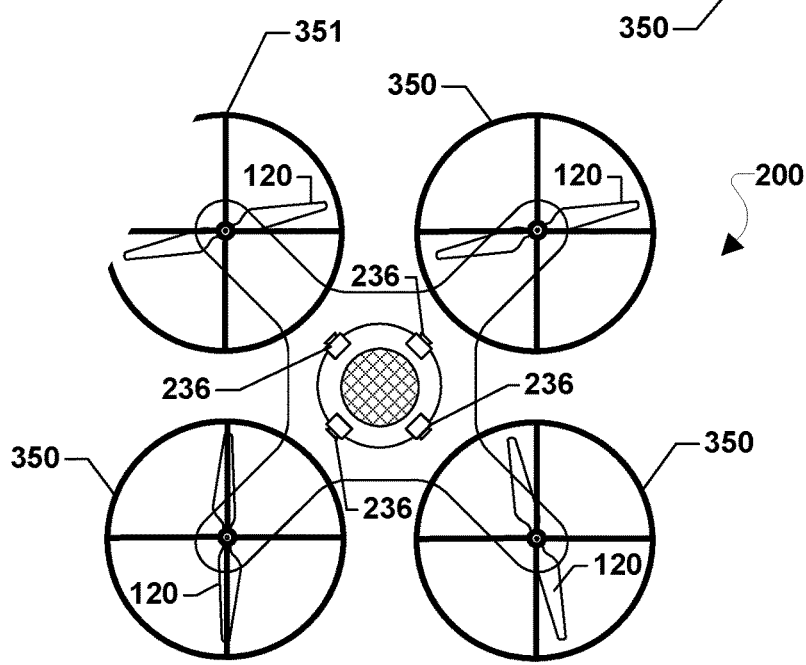

FIGS. 3A-3C illustrate exemplary conditions in which propeller guards 350 may be installed on an aerial robotic vehicle that may be detected with systems and methods according to various embodiments. With reference to FIGS. 1-3C, the propeller guards 350 are merely illustrative and should not be considered to limit the possible propeller guards that may be detected by an aerial robotic vehicle (e.g., 200).

The processor (e.g., 220) of an aerial robotic vehicle (e.g., 200) may perform monitoring operations (e.g., data collection and processing) before, during, and/or after flight, such as by accessing readings from on-board sensors to determine whether propeller guards are installed, damaged, and/or meet certain standards. In particular, the processor may receive and analyze images (i.e., video or still images) from one or more cameras (e.g., cameras 236). The images received by the processor may show all or part of any propeller guards present during inspection. Camera angles that provide images of the area surrounding each rotor 120 may be preferred for determining whether propeller guards are installed.

FIG. 3A illustrates the aerial robotic vehicle 200 with a propeller guard 350 that completely surrounds each of the four rotors 120. The processor of the aerial robotic vehicle analyzing an image of the area around each the rotors 120 (obtained by the cameras 236) may recognize that a fixed structure surrounds all or part of each rotor 120 or that the fixed structure surrounding the rotor 120 matches a shape of a propeller guard.

FIG. 3B illustrates the aerial robotic vehicle 200 with three out of four propeller guards 350 (i.e., one propeller guard is not present). The missing propeller guard may have fallen off or was never installed. The processor of the aerial robotic vehicle analyzing an image of the area around each the rotors 120 (obtained by the cameras 236) may recognize that no propeller guard is installed around one rotor 120.

FIG. 3C illustrates the aerial robotic vehicle 200 with a propeller guard 350 surrounding three out of four rotors 120 and a fourth damaged propeller guard 351 partially surrounding one of the rotors 120. In addition to recognizing that propeller guards 350, 351 are installed, the processor may analyze a shape of the propeller guards 350, 351 to determine whether any of the propeller guards 350, 351 are damaged. In various embodiments, a significantly damaged propeller guard may be treated the same was as a missing propeller guard. Thus, the processor may set one or more flight parameters to values appropriate for operating without or with a propeller guard in response to determining that the propeller guard is damaged or is not damaged, respectively.

In some embodiments, the processor may determine whether an installed propeller guard is damaged through visual processing and image recognition methods. For example, images received by the processor of an installed propeller guard may be compared to previously stored images of undamaged propeller guards. In addition, the detected structure of a propeller guard may be examined for a crack, gap, rip, nick, bend, crease, fracture, and or other physical deficiencies in continuity. Further, sensors may be used to detect unusual vibrations, movement, or other deviations from normal conditions that may indicate something is wrong with an installed propeller guard. The processor may use stringent requirements for considering a propeller guard undamaged, such as any minor deviation from a standard propeller guard shape being considered damaged. In the event that a non-standard profile shape of a currently installed propeller guard is detected, the propeller guard may be considered, "damaged," and error message may be output by the processor to make an operator or owner of the aerial robotic vehicle aware of the condition.

Additionally, or alternatively, if some discontinuity or irregularity is detected, the processor may assess, based on the degree of a normal profile shape that is missing, whether the propeller guards 350, 351 should be considered to be damaged. While a propeller guard may have minor irregularities, the overall structure may serve the intended purpose of guarding the rotor 120 from impact with obstacles (i.e., objects). For example, if less than 2% of the overall structure of a propeller guard (e.g., 351) is missing, the processor may determine the propeller guard 351 is not damaged. In addition, the determination regarding propeller guard damage may depend on where the damage is located. For example, if only an inner portion of the propeller guard 351 (i.e., facing the center of the aerial robotic vehicle) had been missing, the discontinuity may not be considered significant enough to treat the propeller guard in the same way that a missing propeller guard is treated. In the event that minor defects are detected, but the propeller guard is not considered "damaged," an error message may be output by the processor to make an operator or owner of the aerial robotic vehicle aware of the condition.

In some embodiments, the processor may also determine whether an installed propeller guard meets a predetermined standard for propeller guards. Similar to the damage assessment described above, the processor may determine whether an installed propeller guard meets the predetermined standard through visual processing and image recognition methods. The predetermined standard may include a minimum size or style of propeller guards.

Figure 4:
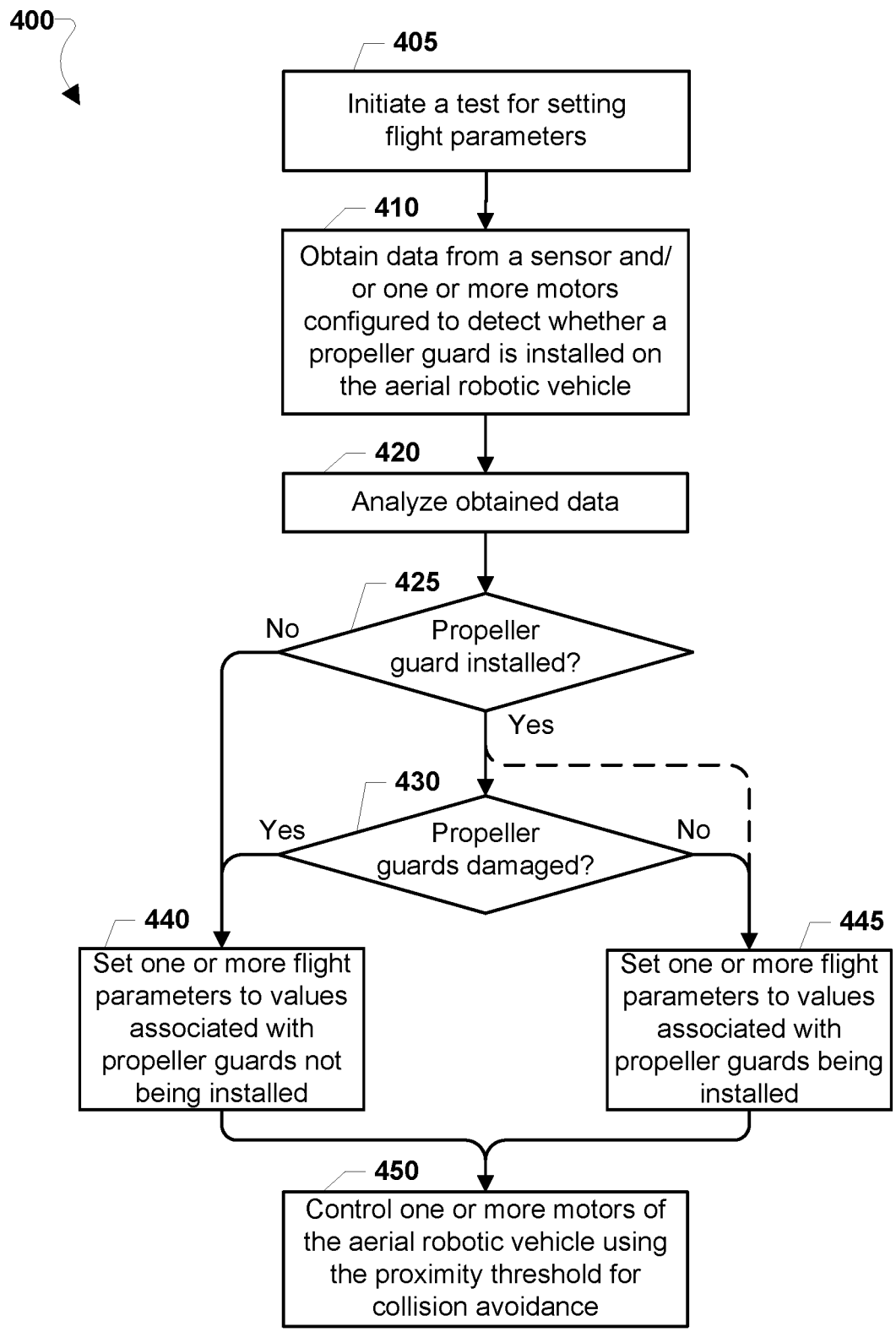
FIG. 4 is a process flow diagram illustrating methods for operating an aerial robotic vehicle, in response to determining whether propeller guards are installed on the aerial robotic vehicle, according to some embodiments.

FIG. 4 illustrates a method 400 for operating an aerial robotic vehicle according to some embodiments. With reference to FIGS. 1A-4, the method 400 may be performed by a processor, such as a processor (220) within a processing device (e.g., 210) of an aerial robotic vehicle (e.g., 100, 200) to detect whether propeller guards (e.g., 250, 350) are installed and set flight parameters accordingly in response thereto.

In block 405, the processor may initiate a test for setting the flight parameters associated with propeller guards. The test for setting the flight parameters may be initiated at start-up (i.e., when the processor is turned on or woken up from a sleep mode). Additionally, the test for setting the flight parameters may be initiated when conditions change. For example, upon receipt by the processor of an input from a sensor, like a contact sensor, the test for setting the flight parameters may be automatically initiated. As a further example, in response to an event, such as a crash or heavy impact to the aerial robotic vehicle, the processor may force the initiation of the test for setting the flight parameters. In addition, the aerial robotic vehicle may be configured to receive an input override, from an operator or control system, indicating the propeller guard is or is not installed. The input override may supersede any determination regarding whether the propeller guard is installed based on sensor data.

In some embodiments, the processor may repeat the operations of the method 400 to detect and respond to anomalies in the propeller guards and/or rotors of an aerial robotic vehicle having one or more rotors. For example, the processor may repeat the operations of the method 400 continuously or until all propeller guards are checked to ensure safe and proper operation of the aerial robotic vehicle. As another example, the processor may repeat the operations of the method 400 for a predefined number of iterations indicated in pre-flight testing instructions provided to the aerial robotic vehicle before take-off. Thereafter, the processor may optionally repeat the operations of the method 400 at regular intervals during flight or at other times established for doing so.

In block 410, the processor may obtain data from one or more sensors and/or one or more motors of the aerial robotic vehicle that are configured to detect whether a propeller guard is installed on the aerial robotic vehicle. Such obtained data may be stored in local memory, such as a buffer, to support image processing in subsequent operations. The obtained data may be stored for tracking usage history or incident data (e.g., an unusual circumstance detected). In addition, stored data may be used for subsequent comparison with image analysis for recognizing the same propeller guards, if removed and later reinstalled on the aerial robotic vehicle.

Cameras (e.g., 236) may be used exclusively or in combination with other sensors. One or more cameras may be mounted under the rotors or in the plane of the rotors. Structural anomalies (e.g., rips, nicks, bends, creases, or similar damage) may be detected through analysis of still images. Camera images may be used to detect a missing propeller guard (e.g., fallen off or was ripped off). The processor may receive images from one or more cameras (e.g., 236) that image the propellers, and thus will image propeller guards, if in place. In some implementations, the processor may receive image data from multiple cameras, which may enable the processor to better assess structures installed near the rotors to determine whether such structures are propeller guards and if such structures are propeller guards whether the propeller guards are damaged and/or properly installed.

The processor may additionally or alternatively receive data from other types of sensors, such as contact sensors and/or weight sensors that are activated when propeller guards are installed, if in place. Conductive material may be embedded in or on the propeller guards, which when in contact with a receiving conductive material of the aerial robotic vehicle may indicate a propeller guard is installed. Similarly, a portion of the rotor motors (e.g., where propeller guards may be installed) may include strain gauges that are configured to detect when propeller guards are installed. Also, resistive or capacitive sensors may be attached to or embedded in propeller guards. Additionally, or alternatively, active sensors mounted on a body of the aerial robotic vehicle, but remote from the rotors, may measure passive material embedded in or on one or more propeller guards. For example, the processor may receive data from a radio-frequency identification (RFID) reader configured to detect the presence of an RFID transmitter that may be included on or embedded in propeller guards for detection by the processor.

The processor may additionally or alternatively receive data from one or more motors of the aerial robotic vehicle indicating a rate of revolution (e.g., RPM) of the respective one or more motors. The rate of revolution of the one or more motors may be used to determine whether or not a propeller guard is installed. The rate of revolution of a motor may be directly related to the thrust produced by a propeller associated with that motor. When one or more propeller guards are installed on the aerial robotic vehicle, the aerial robotic vehicle will weigh a little bit more in flight. Such extra weight may require the motors to spin faster in order to perform flight maneuvers. Thus, extra weight detected from the rate of revolution of the motors may be associated with something extra being installed on the aerial robotic vehicle, such as one or more propeller guards.

In block 420, the processor (or another processor configured to perform such analysis) may analyze the obtained data to determine whether a propeller guard is installed on the aerial robotic vehicle. For example, using camera image data, the processor may perform image processing analysis to detect edges, masses and other features characteristic of propeller guards within the field of view. As another example, the processor may recognize contact and/or weight sensor signals, as well as signals from an RFID reader if included, that indicate a propeller guard is installed.

Alternatively or additionally, the processor may analyze the rate of revolution of one or more motors to determine how many propeller guards are installed or whether all propeller guards are installed. For example, if only three propeller guards are installed on the aerial robotic vehicle, then the weight of the aerial robotic vehicle will be less than when four propeller guards are installed. Additionally, the center of gravity of the aerial robotic vehicle may change if not all propeller guards are installed, which may be detected by the obtained data indicating the rate of revolution of one or more motors. The rate of revolution of the one or more motors may be slightly higher when the geometric center of the aerial robotic vehicle does not coincide with the center of gravity thereof. Additionally, during vehicle motion of the aerial robotic vehicle, the processor may consider angular velocity data in conjunction with the rate of revolution data to compute a moment of inertia of the aerial robotic vehicle. If the computed moment of inertia is different from a base-line or default, this may be an indication that additional mass is installed or has been removed.

In some embodiments, the analysis regarding whether a propeller guard is installed may be based solely on detection of the presence of one or more propeller guards (e.g., receiving an indication a propeller guard is installed from a contact sensor). In some embodiments, the determination regarding whether a propeller guard is installed may involve further analysis regarding characteristics of structures installed near the rotors to determine whether such structures are propeller guards, whether detected propeller guards are undamaged, and/or whether detected propeller guards meet predetermined standards.

In determination block 425, the processor may determine whether a propeller guard is installed based on the data analyzed in block 420.

In response to determining that a propeller guard is not installed (i.e., determination block 425="No"), the processor may set the flight parameters to values associated with propeller guards not being installed, in block 440. The flight parameter values associated with propeller guards not being installed may include a first set of parameters including settings for control gains, drag profile control settings, a maximum rotor speed, maximum speed of the aerial robotic vehicle, maximum power usage, restrictions to select modes of operation, visual algorithm settings, and/or a flight plan of the aerial robotic vehicle. In contrast, the flight parameter values associated with propeller guards being installed may include a second set of parameters including different settings for control gains, drag profile control settings, a maximum rotor speed, maximum speed of the aerial robotic vehicle, maximum power usage, restrictions to select modes of operation, visual algorithm settings, and/or a flight plan of the aerial robotic vehicle.

In response to determining that a propeller guard is installed (i.e., determination block 425="Yes"), the processor may determine whether a propeller guard (i.e., the propeller guard determined to be installed in determination block 425) is damaged in determination block 430. Optionally or alternatively, in response to determining that a propeller guard is installed (i.e., determination block 425="Yes"), the processor may set the flight parameters to the lower value in block 445.

In response to determining that the propeller guard is damaged (i.e., determination block 430="Yes"), the processor may set the flight parameters to values associated with propeller guards not being installed, in block 440. Alternatively, or additionally, the processor may issue a maintenance alert or force maintenance in response to determining that the propeller guard is damaged (i.e., determination block 430="Yes").

In response to determining that propeller guard is not damaged (i.e., determination block 430="No"), the processor may set the flight parameters to values associated with propeller guards being installed, in block 445.

Setting the flight parameters in blocks 440 and/or 445 may or may not involve changing the current flight parameters value, depending on the current flight parameter settings and the desired flight parameter settings based on the determination as to whether the propeller guard is installed on the aerial robotic vehicle. For example, setting the flight parameter of the aerial robotic vehicle may include setting the flight parameter to values associated with the propeller guard not being installed in response to determining that the propeller guard is not installed. As a further example, setting the flight parameter of the aerial robotic vehicle may include setting the flight parameter to values associated with the propeller guard being installed in response to determining that the propeller guard is installed. Setting the flight parameter of the aerial robotic vehicle may also include maintaining the flight parameters at a currently set value. In particular, setting the flight parameter may include setting control gains, drag profile control settings, a maximum rotor speed, maximum speed of the aerial robotic vehicle, maximum power usage, restrictions to select modes of operation, visual algorithm settings, or a flight plan of the aerial robotic vehicle.

In some embodiments, control gains may be one part of the flight parameters set by the processor of the aerial robotic vehicle based on the determination of whether propeller guards are installed on the aerial robotic vehicle. Control gains govern the precise proportional value between the magnitude of motor control input signals and output signals. Installing propeller guards on the aerial robotic vehicle increases the vehicle's mass and moment of inertia. Thus, some embodiments adjust the control gains to account for changes in vehicle control due to the presence or absence of propeller guards.

In some embodiments, drag profile control settings may be one part of the flight parameters set by the processor of the aerial robotic vehicle based on the determination of whether propeller guards are installed. The addition of propeller guards may change the drag profile of an aerial robotic vehicle. How much the overall structure of the aerial robotic vehicle resists/restricts the flow of air determines the drag profile, and the amount of change in the drag profile may depending on the type or size of propeller guards installed. Parameters that control the positioning or velocity of the aerial robotic vehicle may be adjusted as part of the changes to drag profile control settings. For example, when propeller guards are install, those propeller guards may add extra drag, which demands a larger forward tilt and/or slightly higher total vehicle thrust in order to maintain the same speed as compared to when those propeller guards are not installed. Also, wind may impact the aerial robotic vehicle more with propeller guards installed, requiring that the position control gains be adjusted to compensate.

In some embodiments, a maximum allowable rotor speed (i.e., max rpm's) and/or maximum speed of the aerial robotic vehicle may be one part of the flight parameters set by the processor of aerial robotic vehicles based on the determination of whether propeller guards are installed. Similarly, in some embodiments, maximum allowable power usage may be one part of the flight parameters set by the processor of aerial robotic vehicles based on the determination of whether propeller guards are installed. An upper bound for an acceptable amount of battery discharge or fuel consumption may be set as a flight parameter. For example, the processor may set a variable to determine the battery efficiency (or fuel consumption) that is acceptable or allowable during a flight plan so that the aerial robotic vehicle may perform assigned duties without reaching a hazardously low level of power available. In some embodiments, the processor may adjust or reconfigure other flight parameters based on such power usage configurations. For example, based on a newly configured maximum allowable power draw, the processor may adjust the top speed allowed during the flight plan, the number of turns (and thus invalidating certain alternative routes), the maximum G-force that the avionics system can command the aerial robotic vehicle to take, the maximum climb rate, and other parameters for controlling the aerial robotic vehicle while executing the flight plan. Power usage may be limited or regulated under certain circumstances, such as to minimize damage to surrounding creatures, objects, or other obstacles when no propeller guards are installed. The aerial robotic vehicle may be more dangerous or intimidating to humans or animals when operating at full power (i.e., with no power limitations) and without propeller guards. In this way, some embodiments may only allow full power usage when propeller guards are installed.

In some embodiments, restrictions to certain modes of operation may be one part of the flight parameters set by the processor of aerial robotic vehicles based on the determination of whether propeller guards are installed. For example, when propeller guards are determined not to be installed, the processor of the aerial robotic vehicle may prevent the "follow-me" mode or the "palm take-off/landing" mode to be used. Modes of operation, like the follow-me mode or the palm take-off/landing mode, generally require the aerial robotic vehicle to operate very close the human operator or other creatures and objects, which may be dangerous if propeller guards are not installed.

In some embodiments, visual algorithm settings that control imaging collected and output by the aerial robotic vehicle may be one part of the flight parameters set by the processor of the aerial robotic vehicle based on the determination of whether propeller guards are installed. For example, the visual algorithm setting may be configured to mask, ignore, or conceal regions in which propeller guards are present, in order to supply imaging unobstructed by structures like the propeller guards.

In some embodiments, the flight plan may be one part of the flight parameters set by the processor of the aerial robotic vehicle based on the determination of whether propeller guards are installed on the aerial robotic vehicle. For example, the processor may add or remove waypoints in the flight plan to avoid humans, creatures, or objects. In some embodiments, the processor may adjust the flight plan such that a plotted path or route has an improved likelihood of success based on the determinations of the current capabilities of the aerial robotic vehicle. For example, the processor associated with the aerial robotic vehicle and/or a remote server configured to program the flight plan for the aerial robotic vehicle may adjust altitude and/or add, remove, and/or modify waypoints of the flight plan in order to move the aerial robotic vehicle through areas with fair weather that may not require actions that would endanger the safety of the aerial robotic vehicle, creatures, objects, or structures. Adjustments to the flight plan may include changing one or more values of coordinates of waypoints of the flight plan. The flight plan may include coordinates, turn lists, changes in altitude, hovers, etc., as well as flight parameters associated with various portions of the flight plan, such as airspeed, altitude, power usage, allowed maneuvers, or rotor configurations to use during particular segments of the flight plan. In some embodiments, the flight plan data may be a list of commands or a script to perform for moving the aerial robotic vehicle. Data indicating flight conditions associated with the flight plan may include real-time data and/or historic data indicating the weather, traffic, geography (e.g., terrain type, sea level, etc.), wind characteristics, and other information relevant to operating aircraft along the flight plan. For example, the flight conditions may indicate that there is currently or predicted to be a storm along the preset flight route from a warehouse to a customer's house, which may be avoided with an updated flight plan.

In some embodiments, in order to determine the flight parameters to set in block 440 and/or block 445, the processor may obtain instructions by retrieving data from local or remote storage or memory and/or receiving (or downloading) instructions from other devices, such as a server (e.g., 40) or other remote computing device. For example, the processor of the aerial robotic vehicle may download instructions from a server, desktop, mobile device, or other device that is used by a human operator to control or provide inputs to the aerial robotic vehicle. In some embodiments, the instructions may be related to the particular type, class, and/or structure of the aerial robotic vehicle or the detected anomaly. In some embodiments, the instructions may be based on standard flight protocols and/or regulations, such as Federal Aviation Administration (FAA) requirements or specifications for particular types of aircraft. For example, based on general safety requirements for aerial robotic vehicles, the instructions may include instructions requiring the aerial robotic vehicle to fly in a particular way.

In block 450, the processor may control one or more motors of the aerial robotic vehicle to govern how the aerial robotic vehicle navigates using the currently set flight parameters. For example, the processor may send signals to control one or more of the motors (e.g., 125) of the aerial robotic vehicle (e.g., 100, 200) for navigation. The processor may control the one or more motors using currently set gain controls, drag profile control settings, maximum allowable rotor speed, maximum vehicle speed, maximum power usage, restrictions to certain modes of operation, and/or a flight plan, according to the flight parameters (i.e., set in blocks 440 or 445). In some embodiments, the aerial robotic vehicle may continue to operate normally executing user commands and/or a preloaded flight plan relying on the set flight parameters to prevent or restrict unsafe activity. In some embodiments, the processor of the aerial robotic vehicle may use the visual algorithm settings associated with the determination as to whether the propeller guard is installed, while otherwise operating normally.

Figure 5:
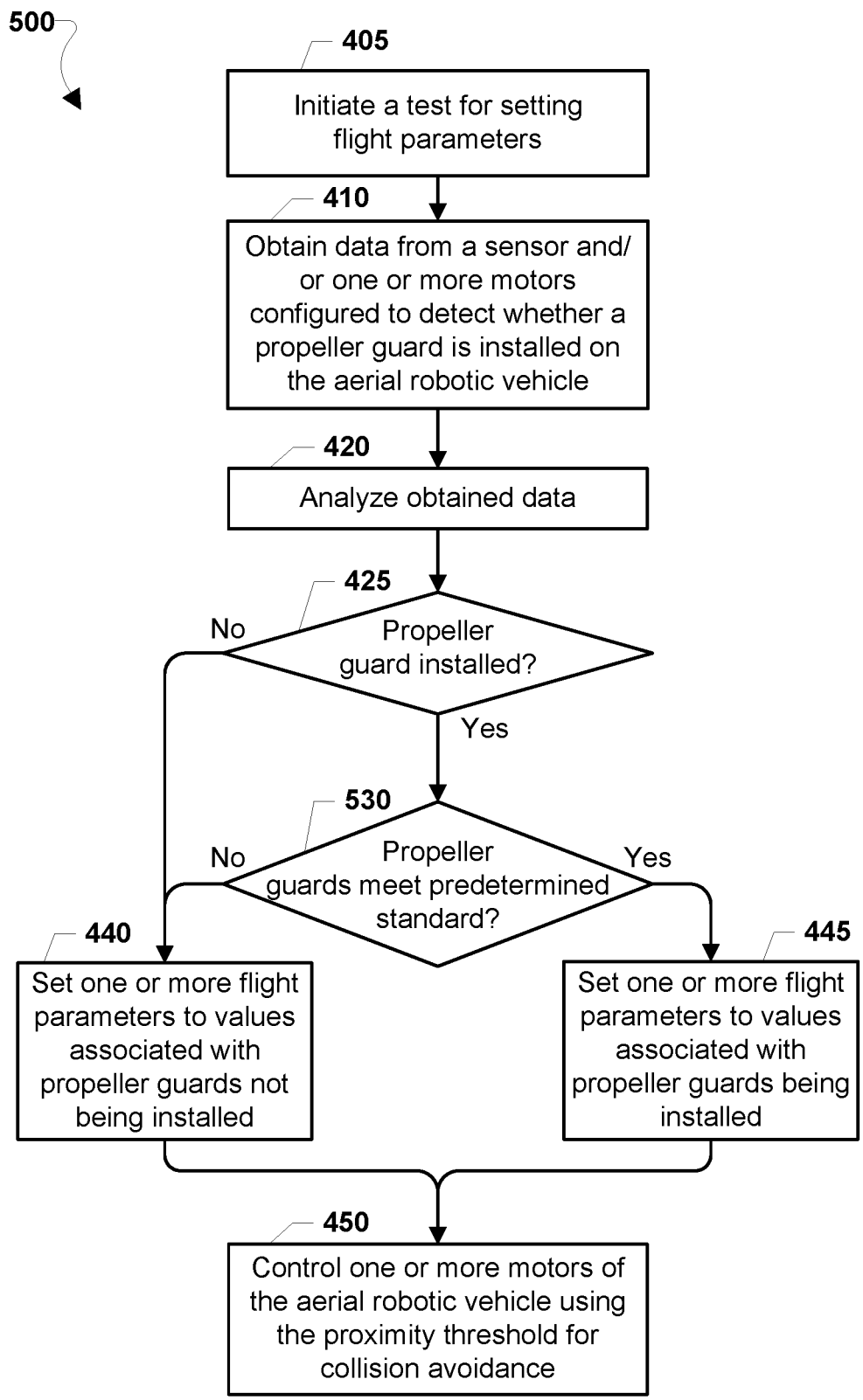
FIG. 5 is a process flow diagram illustrating methods for operating an aerial robotic vehicle, in response to determining whether detected propeller guards meet a standard, according to some embodiments.

FIG. 5 illustrates a method 500 for operating an aerial robotic vehicle according to some embodiments. With reference to FIGS. 1-5, the method 500 may be performed by a processor, such as a processor (220) within a processing device (e.g., 210) of an aerial robotic vehicle (e.g., 100, 200) to detect whether propeller guards (e.g., 250, 350) are installed and set one or more flight parameters accordingly, in response thereto. In the method 500, the processor may perform operations of blocks 405, 410, 420, 440, 445, and 450, as well as determination block 425, of the method 400 as described above.

In response to determining that a propeller guard is installed (i.e., determination block 425="Yes"), the processor may determine whether a propeller guard (i.e., the propeller guard determined to be installed in determination block 425) meets a predetermined standard in determination block 430.

In response to determining that the propeller guard does not meet the predetermined standard (i.e., determination block 530="No"), the processor may set the flight parameters to values associated with propeller guards not being installed, in block 440. Alternatively, or additionally, the processor may issue a maintenance alert or force maintenance in response to determining that the propeller guard does not meet the predetermined standard (i.e., determination block 530="No").

In response to determining that propeller guard meets the predetermined standard (i.e., determination block 530="Yes"), the processor may set the flight parameters to values associated with propeller guards being installed, in block 445.

Figure 6:
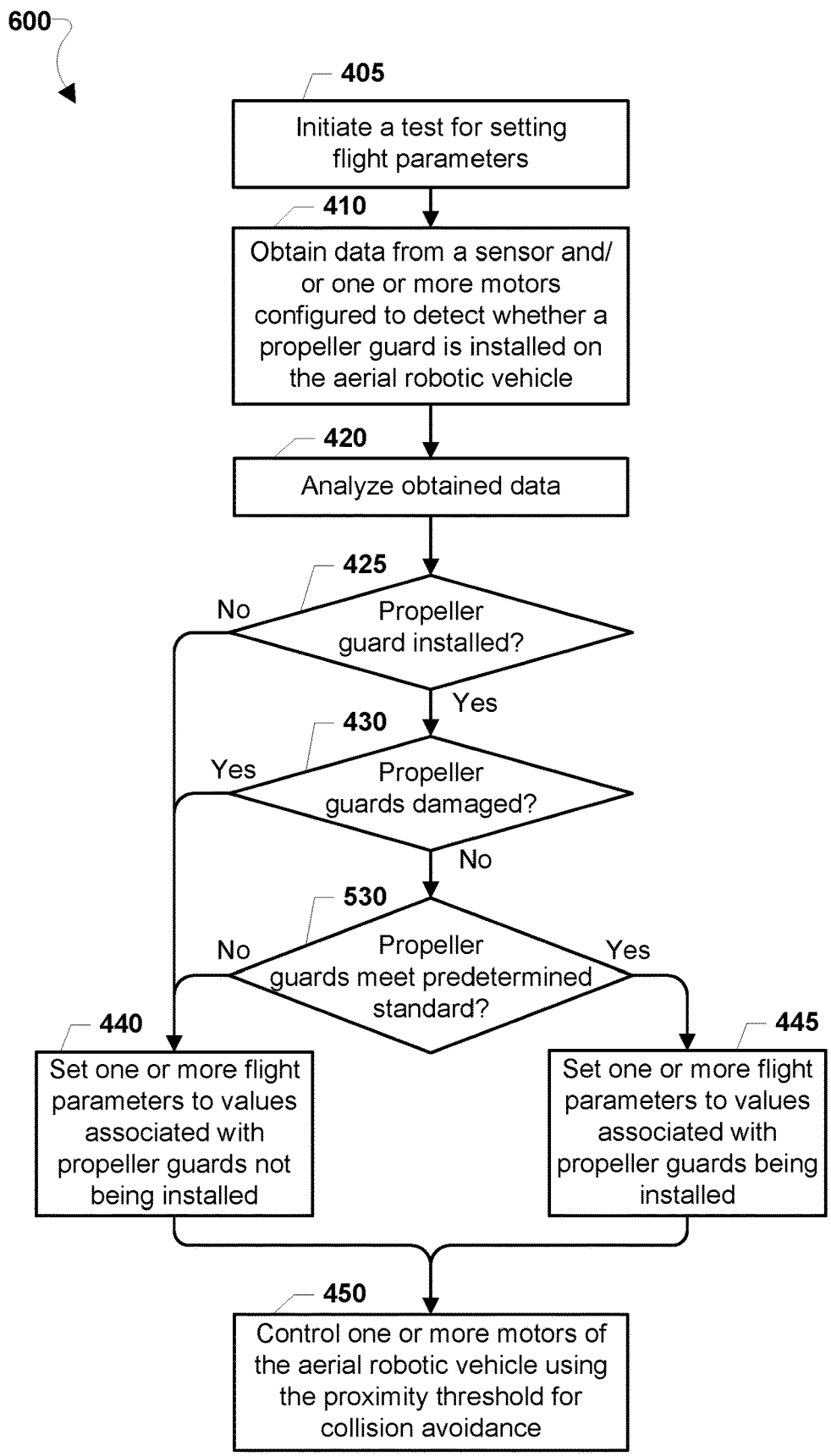
FIG. 6 is a process flow diagram illustrating methods for operating an aerial robotic vehicle, in response to determining whether propeller guards are installed on the aerial robotic vehicle and whether detected propeller guards meet a standard, according to some embodiments.

FIG. 6 illustrates a method 600 for operating an aerial robotic vehicle according to some embodiments. With reference to FIGS. 1-6, the method 600 may be performed by a processor, such as a processor (220) within a processing device (e.g., 210) of an aerial robotic vehicle (e.g., 100, 200) to detect whether propeller guards (e.g., 250, 350) are installed and set flight parameters accordingly in response thereto. In the method 600, the processor may perform operations of blocks 405, 410, 420, 440, 445, and 450 and determination block 425 of the method 400, as well as determination block 530 of the method 500 as described above.

Figure 7:
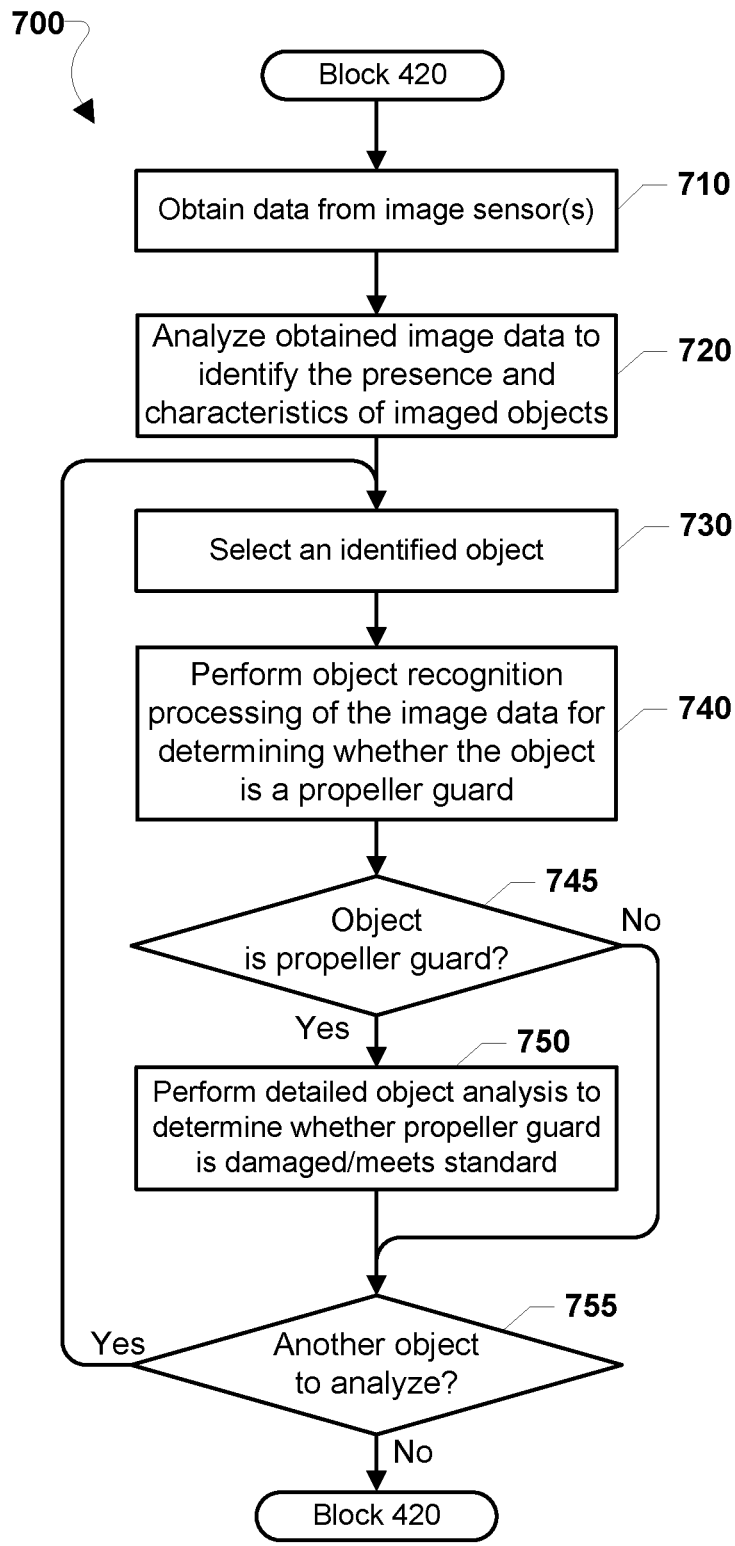
FIG. 7 is a process flow diagram illustrating methods for analyzing obtained data from image sensors, according to some embodiments.

FIG. 7 illustrates a method 700 for detecting and classifying objects for use in the method 400 according to some embodiments. With reference to FIGS. 1A-7, the method 700 may be performed by a processor, such as a processor (220) within a processing device (e.g., 210) of an aerial robotic vehicle (e.g., 100, 200) to detect obstacles (e.g., 120) and perform an action in response.

In block 710, the processor may obtain data from image sensors, such as one or more cameras positioned on the robotic vehicle. Such image data may be stored in local memory for processing, such as buffer memory.

In block 720, the processor may analyze the obtained image data to identify the presence and characteristics of objects in the vicinity of a rotor to determine whether that object is a propeller guard. Such image analysis may involve identifying edges zones of different colors and other types of processes that are typically used to identify objects within images. In some embodiments, the aerial robotic vehicle may be equipped with stereoscopic cameras which may enable the processor to determine the distance to various objects, or parts of objects, using stereoscopy. Determining the location and/or dimensions of objects may generate a file or database of object coordinates in memory that enables the processor to generate a map of objects in subsequent operations.

Each of the objects that are identified in block 720 may be individually analyzed using image recognition processes. To do so, the processor may implement a loop to individually investigate each object. Thus, in block 730, the processor may select one of the identified objects, and perform object recognition processing on of the image data for the selected object to determine whether the object in a propeller guard in block 740. As described, such image recognition processing may involve comparing image data to the database of known propeller guards to determine whether there is a close match. Such image recognition processes may involve the use of machine learning techniques.

In determination block 745, the processor may determine whether the object is a propeller guard.

In response to determining that the selected object is not a propeller guard (i.e., determination block 745="No"), the processor may determine whether there is another object within the image data to identify in determination block 755.

In response to determining that the selected object is a propeller guard (i.e., determination block 745="Yes"), the processor may perform a more detailed analysis of the select object to determine whether the propeller guard is damaged and/or meets predetermined standards in block 750.

In determination block 755, the processor may determine whether there is another object within the image data that needs to be analyzed. In response to determining there is another object within the image data to analyze (i.e., determination block 755="Yes"), the processor may select another identified object in block 730 and repeat the operations of blocks 740-750 as described. When all objects have been analyzed (i.e., determination block 755="No"), the processor may proceed to determine whether a propeller guard is installed in determination block 425 of the methods 400, 500, and/or 600 as described.

Figure 8:
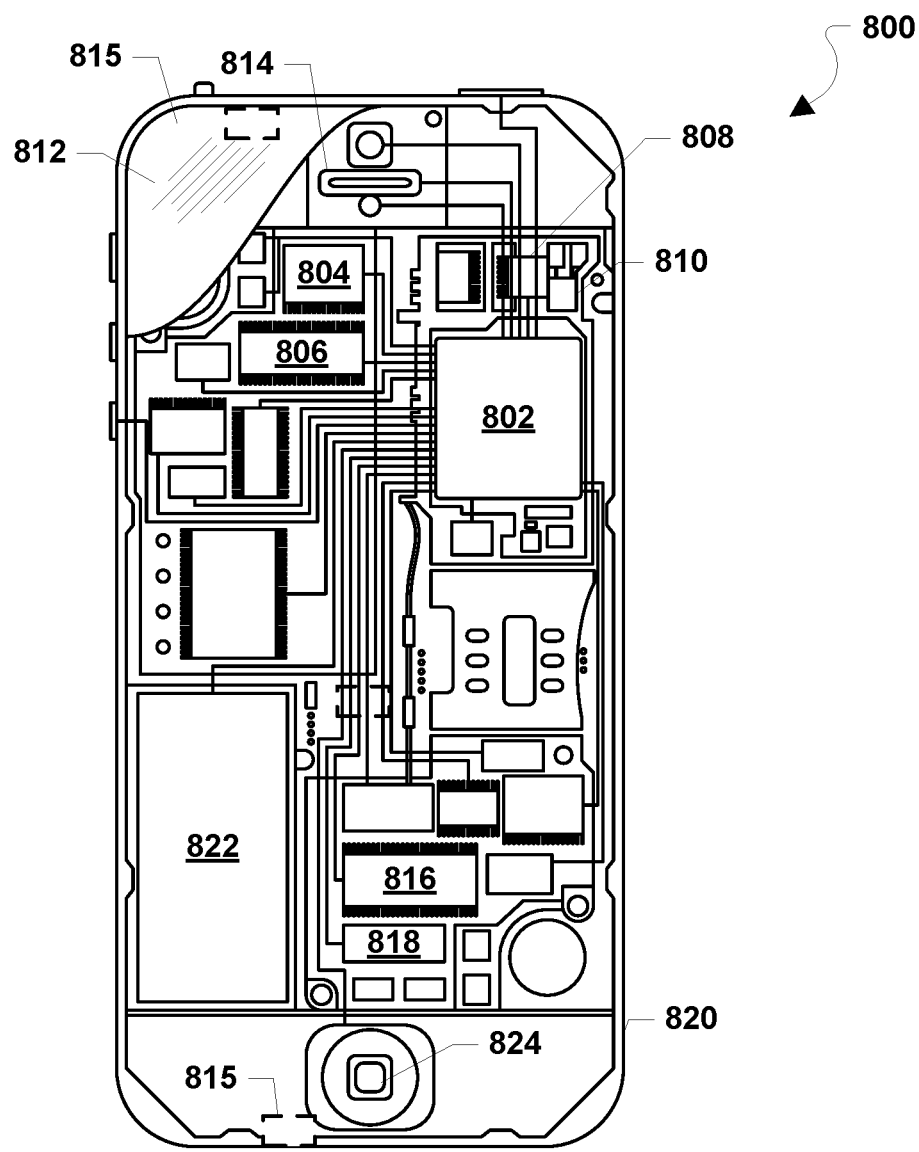
FIG. 8 is a component block diagram of a remote computing device suitable for use in some embodiments.

As described, the processor (e.g., 220) of the aerial robotic vehicle (e.g., 200) may determine whether an anomaly in a rotor is detected, may determine whether vehicle flight is authorized despite the anomaly based on commands received or data obtained from a remote computing device. In such embodiments, communications with the aerial robotic vehicle may be implemented including personal computers, wireless communication devices (e.g., smartphones, etc.), servers, laptop computers, etc., an example of which in the form of a smartphone 800 is illustrated in FIG. 8. With reference to FIGS. 1-8, a remote computing device 800 may include a processor 802 coupled with the various systems and components. For example, the processor 802 may be coupled to a touch screen controller 804, radio communication elements, speakers and microphones, and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof.

The touch screen controller 804 and the processor 802 may also be coupled to a touch screen panel 812, such as a resistive-sensing touch screen, capacitive-sensing touch screen, infrared sensing touch screen, etc. Additionally, the display of the remote computing device 800 need not have touch screen capability. The remote computing device 800 may have one or more radio signal transceivers 808 (e.g., Peanut, Bluetooth, Bluetooth LE, ZigBee, Wi-Fi®, radio frequency (RF) radio, etc.) and antennae, the remote computing device antenna 810, for sending and receiving communications, coupled to each other and/or to the processor 802. The radio signal transceivers 808 and the remote computing device antenna 810 may be used with the above-mentioned circuitry to implement the various wireless transmission protocol stacks and interfaces. The remote computing device 800 may include a cellular network wireless modem chip 816 coupled to the processor that enables communication via a cellular network.

The remote computing device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

In various embodiments, the remote computing device 800 may include one or more microphones 815. For example, the remote computing device may have microphones 815 that are conventional for receiving voice or other audio frequency energy from a user during a call. The remote computing device 800 may also include speakers 814 for providing audio outputs. The remote computing device 800 may also include a housing 820, constructed of a plastic, metal, or a combination of materials, for containing all or some of the components. The remote computing device 800 may include a power source 822 coupled to the processor 802, such as a disposable or rechargeable battery. The rechargeable battery may also be coupled to the peripheral device connection port to receive a charging current from a source external to the remote computing device 800. The remote computing device 800 may also include a physical button 824 for receiving user inputs (e.g., an input override indicating whether the propeller guard is or is not installed).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any example embodiment. For example, one or more of the operations of the methods 300, 400, 500, 600, and/or 700 may be substituted for or combined with another.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for operating an aerial robotic vehicle, comprising:
   determining, by a processor of the aerial robotic vehicle, whether a propeller guard is installed on the aerial robotic vehicle;
   setting, by the processor, a flight parameter of the aerial robotic vehicle based on the determination as to whether the propeller guard is installed on the aerial robotic vehicle, wherein setting the flight parameter comprises setting a proximity threshold; and
   controlling, by the processor, navigation of the aerial robotic vehicle using the flight parameter of the aerial robotic vehicle.

2. The method of claim 1, wherein setting the flight parameter of the aerial robotic vehicle comprises setting the flight parameter to values appropriate for controlling the navigation of the aerial robotic vehicle when the propeller guard is not installed in response to determining that the propeller guard is not installed.

3. The method of claim 1, wherein setting the flight parameter of the aerial robotic vehicle comprises setting the flight parameter to values appropriate for controlling the navigation of the aerial robotic vehicle when the propeller guard is installed in response to determining that the propeller guard is installed.

4. The method of claim 1, wherein setting the flight parameter of the aerial robotic vehicle comprises maintaining the flight parameter at a currently set value in response to determining that the propeller guard is installed.

5. The method of claim 1, wherein setting the flight parameter includes setting one or more of control gains, drag profile control settings, a maximum rotor speed, maximum speed of the aerial robotic vehicle, maximum power usage, restrictions to select modes of operation, visual algorithm settings, or a flight plan of the aerial robotic vehicle in response to determining that the propeller guard is installed.

6. The method of claim 1, further comprising:
   determining whether the propeller guard is damaged in response to determining that the propeller guard is installed, wherein setting the flight parameter is further based on the determination of whether the propeller guard is damaged.

7. The method of claim 1, further comprising:
   determining whether the propeller guard meets a predetermined standard in response to determining that the propeller guard is installed, wherein setting the flight parameter is further based on the determination of whether the propeller guard meets the predetermined standard.

8. The method of claim 7, wherein the predetermined standard includes a minimum size for propeller guards.

9. The method of claim 7, wherein the predetermined standard includes a style of the propeller guard.

10. The method of claim 1, further comprising:
    obtaining, by the processor, data from a sensor configured to detect whether the propeller guard is installed on the aerial robotic vehicle; and
    analyzing the obtained data to determine whether the propeller guard is installed.

11. The method of claim 10, wherein the sensor is at least one of a contact sensor, a weight sensor, an image sensor, or a radio-frequency identification tag reader.

12. The method of claim 10, wherein analyzing the obtained data includes comparing the obtained data to previously collected data indicating the propeller guard is installed, wherein the propeller guard is determined to be installed in response to the obtained data matching the previously collected data indicating the propeller guard is installed and the propeller guard is determined to not be installed in response to the obtained data not matching the previously collected data indicating the propeller guard is installed.

13. The method of claim 10, wherein analyzing the obtained data includes comparing the obtained data to predetermined parameters indicating the propeller guard is installed, wherein the propeller guard is determined to be installed in response to the obtained data matching the predetermined parameters indicating the propeller guard is installed and the propeller guard is determined to not be installed in response to the obtained data not matching the predetermined parameters indicating the propeller guard is installed.

14. The method of claim 1, further comprising:
    obtaining, by the processor, data from the one or more motors indicating a rate of revolution of the respective one or more motors; and
    analyzing the obtained data to determine whether the propeller guard is installed.

15. The method of claim 14, wherein analyzing the obtained data determines how many propeller guards are installed on the aerial robotic vehicle.

16. The method of claim 1, further comprising:
    receiving, by the processor, an input override indicating the propeller guard is or is not installed, wherein determining whether the propeller guard is installed is further based on the received input override.

17. The method of claim 1, wherein controlling the navigation of the aerial robotic vehicle using the flight parameters of the aerial robotic vehicle comprises one or more of controlling take off, landing or flight path of the aerial robotic vehicle.

18. An aerial robotic vehicle, comprising:
    a sensor onboard the aerial robotic vehicle configured to detect whether a propeller guard is installed; and
    a processor coupled to the sensor and configured with processor-executable instructions to:
      determine whether the propeller guard is installed on the aerial robotic vehicle based on data from the sensor;
      set a flight parameter of the aerial robotic vehicle based on the determination as to whether the propeller guard is installed on the aerial robotic vehicle, wherein setting the flight parameter comprises setting a proximity threshold; and
      control navigation of the aerial robotic vehicle using the flight parameter of the aerial robotic vehicle.

19. The aerial robotic vehicle of claim 18, wherein the processor is configured with processor-executable instructions to set the flight parameter of the aerial robotic vehicle by:
    setting the flight parameter to values appropriate for controlling the navigation of the aerial robotic vehicle when the propeller guard is not installed in response to determining that the propeller guard is not installed; and
    set the flight parameter to values appropriate for controlling the navigation of the aerial robotic vehicle when the propeller guard is installed in response to determining that the propeller guard is installed.

20. The aerial robotic vehicle of claim 18, wherein the processor is configured with processor-executable instructions to set the flight parameter of the aerial robotic vehicle by setting one or more of control gains, drag profile control settings, a maximum rotor speed, maximum speed of the aerial robotic vehicle, maximum power usage, restrictions to select modes of operation, visual algorithm settings, or a flight plan of the aerial robotic vehicle in response to determining that the propeller guard is installed.

21. The aerial robotic vehicle of claim 18, wherein the processor is further configured with processor-executable instructions to:
   determine whether the propeller guard is damaged in response to determining that the propeller guard is installed; and
   set the flight parameter further based on the determination of whether the propeller guard is damaged.

22. The aerial robotic vehicle of claim 18, wherein the processor is further configured with processor-executable instructions to:
   determine whether the propeller guard meets a predetermined standard in response to determining that the propeller guard is installed; and
   set the flight parameter further based on the determination of whether the propeller guard meets the predetermined standard.

23. The aerial robotic vehicle of claim 22, wherein the predetermined standard includes one or more of a minimum size for propeller guards.

24. The aerial robotic vehicle of claim 22, wherein the predetermined standard includes a style of the propeller guard.

25. The aerial robotic vehicle of claim 18, wherein the sensor is at least one of a contact sensor, a weight sensor, an image sensor, or a radio-frequency identification tag reader.

26. The aerial robotic vehicle of claim 18, wherein the processor is further configured with processor-executable instructions to:
   analyze the obtained data by comparing the obtained data to previously collected data indicating the propeller guard is installed;
   determine that the propeller guard is installed in response to the obtained data matching the previously collected data indicating the propeller guard is installed; and
   determine that the propeller guard is not installed in response to the obtained data not matching the previously collected data indicating the propeller guard is installed.

27. The aerial robotic vehicle of claim 18, wherein the processor is further configured with processor-executable instructions to:
   analyze the obtained data by comparing the obtained data to predetermined parameters indicating the propeller guard is installed;
   determine that the propeller guard is installed in response to the obtained data matching the predetermined parameters indicating the propeller guard is installed; and
   determine that the propeller guard is not in response to the obtained data not matching the predetermined parameters indicating the propeller guard is installed.

28. The aerial robotic vehicle of claim 18, wherein the processor is further configured with processor-executable instructions to:
   obtain, by the processor, data from the one or more motors indicating a rate of revolution of the respective one or more motors; and
   analyze the obtained data to determine whether the propeller guard is installed.

29. The aerial robotic vehicle of claim 18, wherein the processor is further configured with processor-executable instructions to:
   receive an input override indicating the propeller guard is or is not installed, wherein determining whether the propeller guard is installed is further based on the received input override.

30. The aerial robotic vehicle of claim 18, wherein the processor is configured with processor-executable instructions to set the control the navigation of the aerial robotic vehicle by controlling one or more of take off, landing of flight path of the aerial robotic vehicle.

31. A processing device for use in an aerial robotic vehicle and configured to:
   determine whether a propeller guard is installed on the aerial robotic vehicle;
   set a flight parameter of the aerial robotic vehicle based on the determination as to whether the propeller guard is installed on the aerial robotic vehicle, wherein setting the flight parameter comprises setting a proximity threshold; and
   control navigation of the aerial robotic vehicle using the flight parameter of the aerial robotic vehicle.

32. An aerial robotic vehicle, comprising:
   means for determining whether a propeller guard is installed on the aerial robotic vehicle;
   means for setting a flight parameter of the aerial robotic vehicle based on the determination as to whether the propeller guard is installed on the aerial robotic vehicle, wherein the means for setting the flight parameter comprises means for setting a proximity threshold; and
   means for controlling navigation of the aerial robotic vehicle using the flight parameter of the aerial robotic vehicle.

* * * * *